UNITED STATES PATENT OFFICE.

ERNST TWITCHELL, OF CINCINNATI, OHIO.

PROCESS OF DECOMPOSING FATS OR OILS INTO FATTY ACIDS AND GLYCERIN.

SPECIFICATION forming part of Letters Patent No. 601,603, dated March 29, 1898.

Application filed July 17, 1897. Serial No. 644,983. (No specimens.)

*To all whom it may concern:*

Be it known that I, ERNST TWITCHELL, residing at Cincinnati, in the county of Hamilton and State of Ohio, have invented certain new and useful Improvements in Processes of Decomposing Fats or Oils into Fatty Acids and Glycerin, of which the following is a specification.

My invention relates to a process of separating fats or oils into fatty acids and glycerin. The objects of my invention are, first, to separate these constituents without any material discoloration and without any destruction of either the fatty acids or the glycerin, and, second, to cheapen the process by carrying on the operation at the ordinary temperature of boiling water, and dispensing with costly apparatus, high temperatures, and high pressures.

By my process I separate the glycerin from the neutral fat by boiling with water in an open tank, the reaction being induced by a small quantity of a reagent which I prefer to mix with the fat before adding water. This reagent is a compound acid ether of a fatty acid with sulfuric acid, usually termed "sulfofatty" acid. There are a series of these compounds, such as sulfostearic acid, sulfopalmetic acid, sulfoleic acid, &c., depending on the fat or oil employed in their formation. This reagent is very simply prepared by treating oleic acid of commerce with an excess of concentrated sulfuric acid, preferably at a temperature near that of boiling water, and then adding water and skimming off the reagent. Any neutral oil treated in this same manner will produce such a reagent, some of course being more active than others. I add the water for the purpose of removing the excess of sulfuric acid to prevent discoloration of the fats.

The following is the preferred form of process for separating the glycerin and fatty acid: Take an open tank. Place in it a charge of melted fat or oil. Add one per cent. of the reagent above named. Then mix the charge thoroughly. Add fifty per cent. of water, and then boil the charge, preferably by the open steam process, which supplies the water lost by evaporation. The length of time of boiling depends somewhat upon the amount of reagent used. When one per cent. is used, the boiling should be continued from twelve to twenty hours; when five per cent. is used, from five to twelve hours.

The objection to using a larger per cent. of reagents is simply one of cost; but it can be reclaimed and used over again, as hereinafter explained.

After the boiling has been completed the glycerin and water are drawn from the bottom of the tank. The reagent is also present in the water and is separated from the liquid by precipitation. This may be accomplished by the use of sulfuric acid or a metallic oxid or salt, such as lime or alum. When sulfuric acid is used, the reagent is precipitated. Then the sulfuric acid is precipitated from the glycerin and water by lime. When lime is used, it goes down with the reagent, leaving the glycerin-water pure. The lime is then removed from the reagent by a strong acid.

The finished fatty acids are run off from the tank and are ready for use in the soap or candle factories. They of course may be refined by the ordinary process for other uses.

There are very many variations which may be used in carrying out this process. More water may be used; but the smaller the amount of water the less evaporation is required to reclaim the glycerin. After the first boiling I sometimes draw off the water and add a second charge of water and then boil the charge for a few hours, then draw off this liquid and use it as the first liquid for boiling of a first charge of tallow mixed with reagent, as first described.

It is not absolutely essential to boil the charge, as the separation will take place below the boiling-point of water if the charge be well agitated. Of course this operation can be carried on by boiling the charge under pressure; but it is objectionable in that it adds to the cost without a corresponding benefit.

Another modification of my process would be to add the reagent direct to the water and then thoroughly mix the melted tallow or oil with the water; but this is not so quick as the first-described method.

The above process is simple, cheap, and effective. It can be carried on without expensive apparatus, as in the digester process. The reagent employed can be chiefly reclaimed and used over and over again. A larger per cent. of the fatty acids is obtained by this process, and they are purer and much less discolored than by the ordinary acid process employed for the same purpose.

By the process herein described I am enabled to separate the fatty acids from the glycerin without discoloration, which is produced by the addition of the concentrated sulfuric acid to the neutral oils in the old process. Hence the resultant fatty acids are pure enough for ordinary commercial purposes, and no further refining process is necessary. This is a very material saving. I also obtain a larger per cent. of the fatty acids, as the addition of the concentrated sulfuric acid in the old process destroys a portion of these fatty acids; also, my process is much cheaper than the digester process, as the expensive machinery incident to that process is not required. Further, the cost of repairing the machinery in the digester method is an expensive item wholly obviated by my process.

Having described my invention, what I claim is—

1. The process of separating fats into glycerin and fatty acids, by mixing a reagent of sulfo-fatty acids with fat and water, then treating the charge to the action of heat, substantially as specified.

2. The process of separating fats into glycerin and fatty acids, by mixing neutral fats or oils with a reagent of sulfo-fatty acids and water, then treating the charge to the action of heat until the substances are separated, then drawing off the glycerin-water and reclaiming the glycerin, substantially as specified.

3. The process of separating fats into glycerin and fatty acids, by mixing neutral fats or oils with a reagent of sulfo-fatty acids and water, then treating the charge to the action of heat until the substances are separated, then drawing off the glycerin-water and reclaiming the reagent from the glycerin-water, substantially as specified.

In testimony whereof I have hereunto set my hand.

ERNST TWITCHELL.

Witnesses:
OLIVER B. KAISER,
E. E. WOOD.